Patented Jan. 20, 1953

2,626,249

UNITED STATES PATENT OFFICE 2,626,249

RESOL-ALKYD RESIN PRODUCTS

Herbert Hönel, Hamburg-Wandsbek, Germany, and Heinrich Manzano, Vienna, Austria

No Drawing. Application July 22, 1947, Serial No. 762,790. In Germany January 29, 1943

Section 1, Public Law 690, August 8, 1946
Patent expires January 29, 1963

8 Claims. (Cl. 260—20)

In our applications Ser. No. 762,788, filed July 22, 1947, and Ser. No. 762,789, filed July 22, 1947, a process is described for producing hardenable resins suited as basic material for heat hardening or stoving varnishes, according to which resols (phenol-poly-alcohols) derived from phenols having more than two free reaction favourable positions, and alkyd resins having a considerable portion of free, preferably primary, hydroxyl groups are combined and suitably heated for several hours below the hardening temperature of the resol. According to the application, Ser. No. 762,788, filed July 22, 1947, the resols employed are furthermore characterized in that they are derived from phenolic bodies carrying substituents which suitably do not contain more than two C-atoms per phenolic hydroxyl group. According to the prescription of the application, Ser. No. 762,789, filed July 22, 1947, resols derived from common phenol are used and an alkyd resin is simultaneously employed which at least contains a surplus of one free gram-hydroxyl group in 250 g. The combination of the two components is preferably effected in the presence of indifferent solvents and acid catalysts, the reaction water being continuously removed. Hereby as well as upon heat hardening the films produced from the resins, mutual (multi-) etherifications between the alcoholic groups of the two components and consequently the formation of macromolecules evidently take place.

Now it has been found that hardenable resins are obtained which form heat-hardened films showing considerably improved properties if alkyd resins having at least one free gram-hydroxyl group in about 300 g. are combined with resols which due to suitable groups carried by them are improved in the sense of a better compatibility with hydrocarbons. Resols are suited which carry comparatively large substituents containing more than two C-atoms per phenolic nucleus. Such resols are obtained, e. g. in known manner from suitably substituted phenols. Examples are the so-called alkyl-phenols, such as p. tert. butyl phenol, cyclohexyl phenol and the like, phenols substituted in m-position, such as sym. isothymol, polynuclear phenols carrying several oxyphenyl groups linked to a great aliphatic or alicyclic rest, such as dioxy-diphenyl-menthane ($C_{10}H_{18}/C_6H_4OH/_2$), or the resinous phenols (so-called terpene phenol resins) obtainable according to the process of U. S. Patents 2,123,898 and 2,162,172 from phenol and an excess of dipentene, carene or the like, moreover the phenolic bodies obtainable by reacting phenol or cresols with comparatively high carbonyl compounds, e. g. octyl aldehyde, methylcyclohexanone. Suitable resols are also obtained in known manner by interacting comparatively high monoalcohols (e. g. amyl alcohol, octyl alcohol) for a prolonged period of time with common resols (phenol poly-alcohols) derived from mono- or poly-nuclear phenols. By this treatment, as is known, a part of the methylol groups of the resol is etherified whereby modified resols are formed whose structure is analogous to that of resols directly obtainable from alkyl phenols. Thus according to the process of the invention resols may be employed which are derived from phenols having only two reaction favourable positions as well as from phenols having more than two reaction favourable positions provided the substituent contains more than two C-atoms.

The products produced according to the invention are distinguished over those obtainable according to our above mentioned applications in that the films formed therefrom show a substantially increased resistance against cold or boiling, neutral or acidified water and against agents having a saponifying action (washing ingredients) as well as in a given case by particularly favourable solubility properties, e. g. in hydrocarbons.

It has been proposed already to produce hardenable resinous combination products from resols which are derived from phenols carrying comparatively large substituents or which are obtained by heating common phenol alcohols and comparatively high mono-alcohols for a sufficient time, and modifying substances, such as e. g. neutral resins, fatty oils or alkyd resins, which, if at all, contain at least a small number of free hydroxyl groups. If, however, according to the present invention the said resols are combined with alkyd resins rich in hydroxyl groups hardenable resins are obtained which are by far superior to the known products. The films produced therefrom possess substantially better mechanical properties as well as increased resistance against solvents and chemical agents. Moreover the choice of the special esters permits directly to plastify also such resols which cannot be combined with the plastifying substances suggested heretofor.

The alkyd resins which are to be used according to the invention are produced most suitably by systematically employing such an excess of a polyvalent alcohol as compared with the carboxyl groups present in the components used as starting material that in about 300 g. alkyd resin at least one free (preferably primary) gram-hydroxyl group is present. In addition to the free hydroxyl groups the alkyd resin may contain other components adapted for mutual reaction with the resol, such as natural resin acids or especially unsaturated oils (acids of fatty oils) which due to their double linkages give rise to cross-bindings with the resol. If a great number of such unsaturated groups is present in the alkyd resin the number of the free hydroxyl groups may be diminished below the limit given above. The present process, however, preferably serves for producing varnish basic materials being free from oil or at least poor in oil.

Due to the comparatively high molecular weight of the phenols to be employed and the small number of reactive methylol groups in the resol the portion of the latter may be relatively high as compared with our above mentioned applications, and may often amount to more than the half of the combination product. This applies particularly if a low proportion of formaldehyde bound (i. e. of methylol groups) has been chosen systematically. Then heat hardening varnishes are obtained showing particularly high resistance against saponification without being opposed by a deficient elasticity of the film.

As said in our above mentioned applications the resol and the alkyd resin are combined by heating them below the hardening temperature of the resol suitably in the presence of solvents and a small portion of a substance having an acid action, preferably for several hours beyond the point where the mass becomes clear, whilst stirring and removing the water formed and interrupting the heating before gelatinization takes place.

The best results are obtained also in the present case if the resol is employed in an as low molecular condition as possible, i. e., while still in the liquid phenol alcohol stage in which the active methylol groups are still unaltered. This is surprising so far as e. g. combination products being superior with regard to the technic of varnish manufacture are obtained from solid resinous resols derived from so-called alkylphenols, and drying oils than from analogous still liquid resols.

Examples

1. A neutral ester (alkyd resin) obtained from 100 parts adipic acid and 140 parts technical trimethylolpropane having an equivalent weight of about 55 instead of nearly 45 as in the chemically pure compound, containing one gram-hydroxyl group in about 185 g., and a liquid condensation product derived from 225 parts p. tert. butylphenol and 180 parts formaldehyde (30 p. c.) and carefully freed from the alkaline contact agent, are heated together in the presence of xylol. The mutual interaction is suitably supported by adding an acid catalyst soluble in the reaction mixture so that the pH-value is about 4–5, and by continuously removing the reaction water. The heating is interrupted as soon as a sample applied on a surface does not show any appreciable stickiness. A product readily soluble in aromatic solvents is obtained which after being thinned in a suitable way forms a heat hardening varnish. The coatings on metals hardened at 180–200° are distinguished by high lustre, tenacious adhesiveness, excellent resistance against boiling, neutral or acidified water and warm soda solution and the like.

2. An alkyl resin carrying one gram-hydroxyl group in about 200 g. is produced from 100 g. succinic acid, 200 g. "Vorlauffettsäure" and 250 g. tetramethylol-cyclohexanol. The substance referred to as "Vorlauffettsäure" comprising the fatty acid first runnings obtained by catalytically oxidizing paraffine. The molecular weight averages about 130, corresponding to an acid number of about 430. On the other hand a resol (phenol polyalcohol) is formed by condensing in an alkaline medium at room-temperature an interaction product (obtained by means of hydrochlorine) from 300 g. phenol and 180 g. methyl-cyclohexanone, consisting essentially of diphenylol-methyl-cyclohexane, with 500 g. formaldehyde (30 p. c.). The two components are mutually interacted in the way described in Example 1. The product obtained, similar to that obtained there, is especially adapted as a base for heat hardening varnishes. The films are distinguished by very great resistance against motor fuels as well as by other good surface properties.

3. An alkyd resin is produced in the following way: 210 g. citric acid (crist.) and 300 g. high boiling technical mixture of alcohols (boiling limits 140–190°) are heated whilst stirring until 40 g. water are formed, then the esterification product obtained from 210 g. penta-erythrite (techn.) and 180 g. "Vorlauffettsäure" (see Example 2) is added and finally the whole mixture is completely esterified at 200°. After removing the portion which did not enter into reaction, by distillation in vacuo the yield is about 630 g.

A resol is produced in the following way: 100 g. phenol and 200 g. dipentene are condensed with the aid of the catalytic action of each 3 g. gaseous hydrochlorine (which forms dipentene-hydrochlorides intermediary) and zinc chloride at 80 to 100° and polymerized respectively until a solid resin (yield about 280 g.) is formed. After washing the resin which is dissolved in benzene, 150 g. formaldehyde (40 p. c. by vol.) and so much aqueous sodalye are added until a homogeneous mixture is formed whilst stirring. After standing during several days the alkali is completely destroyed by adding about the calculated quantity of a strong mineral acid and the resol-benzene solution is separated from the aqueous layer and washed.

The alkyd resin and the resol solution are caused to interact mutually in the presence of further benzene at boiling temperature in the way described in Example 1.

The product may even be thinned by benzene until it is ready for being applied by brush or by spreading. The film hardened at 190° during half an hour is distinguished by high elasticity and adhesiveness.

4. A liquid resol being water soluble to an unlimited extent, obtained from 1 mol phenol and 2½ mols formaldehyde, and 5 mols n-hexyl alcohol or a corresponding quantity of a technical mixture of comparatively high primary alcohols are heated together at 90°. By adding a suitable acid or an acid ester or the like the pH-value is adjusted to about 5 and the reaction water is continuously removed. After about 12 hours about ¾ mol of the alcohol is entered into reaction with the resol due to etherification of methylol groups. The excess of alcohol is removed in vacuo as far as possible.

The modified resol obtained in this way is heated with 1½ times the quantity of an almost neutral ester obtained from 100 g. adipic acid, 100 g. colophony and 160 g. trimethylol-propane in the presence of xylol as described in Example 1, in a given case also a further quantity of an acid catalyst having been added. After suitable thinning a heat hardening varnish is obtained showing a surprising elasticity and adhesiveness and high resistance against boiling water and soda solution. The modified resol employed here can be substituted by one mentioned in the other examples the result being very similar.

5. An almost neutral alkyd resin obtained from each 100 g. phthalic anhydride, oil acid and penta-erythrite (techn.) in which the penta-erythrite is contaminated with about ten to fifteen percent di-penta-erythrite is further worked up with a liquid resol derived from 200 g. sym. isothylmol and 200 g. formaldehyde in the manner described in the other examples.

We claim:

1. In a process for producing hardenable resins, the improvement which comprises combining (1) a hydrocarbon-compatible liquid resol free from alkaline catalyst, obtained from a phenol having more than two aliphatic C-atoms per each phenolic nucleus, with (2) a plasticizing alkyd resin containing long aliphatic chains and having an excess of free alcoholic OH groups over the carboxylic groups of the ester forming components, said excess amounting to at least one gram OH group per 300 grams of the resin, by protracted heating in a slightly acid medium, at a temperature and for a period insufficient for carrying out the hardening reaction but sufficient for effecting etherification, removing the water, and interrupting the heating before gelation takes place.

2. In a process for producing hardenable resins, the improvement which comprises combining (1) a hydrocarbon-compatible liquid resol free from alkaline catalyst, obtained from a phenol having more than two aliphatic C-atoms per each phenolic nucleus, with (2) a plasticizing alkyd resin containing long aliphatic chains and having an excess of free alcoholic OH groups over the carboxylic groups of the ester forming components, said excess amounting to at least one gram OH group per 300 grams of the resin, by protracted heating in a slightly acid medium, at a temperature and for a period insufficient for carrying out the hardening reaction but sufficient for effecting etherification, removing the water, and interrupting the heating before gelation takes place, the resol being employed in excess.

3. In a process for producing hardenable resins, the improvement which comprises combining (1) a hydrocarbon-compatible liquid resol wherein a considerably smaller quantity of formaldehyde is bound than the maximum one, free from alkaline catalyst, obtained from a phenol having more than two aliphatic C-atoms per each phenolic nucleus, with (2) a plasticizing alkyd resin containing long aliphatic chains and having an excess of free alcoholic OH groups over the carboxylic groups of the ester forming components, said excess amounting to at least one gram OH group per 300 grams of the resin, by protracted heating in a slightly acid medium, at a temperature and for a period insufficient for carrying out the hardening reaction but sufficient for effecting etherification, removing the water, and interrupting the heating before gelation takes place.

4. In a process for producing hardenable resins, the improvement which comprises combining (1) a hydrocarbon compatible phenol alcohol free from alkaline catalyst, obtained from a phenol having more than two aliphatic C-atoms per each phenolic nucleus, with (2) a plasticizing alkyd resin containing long aliphatic chains and having an excess of free alcoholic OH groups over the carboxylic groups of the ester forming components, said excess amounting to at least one gram OH group per 300 grams of the resin, by protracted heating in a slightly acid medium, at a temperature and for a period insufficient for carrying out the hardening reaction but sufficient for effecting etherification, removing the water, and interrupting the heating before gelation takes place.

5. In a process for producing hardenable resins, the improvement which comprises combining (1) a hydrocarbon compatible liquid resol free from alkaline catalyst, obtained from a phenol having more than two aliphatic C-atoms per each phenolic nucleus, with (2) a plasticizing alkyd resin containing long aliphatic chains and having an excess of free alcoholic OH groups over the carboxylic groups of the ester forming components, said excess amounting to at least one gram OH group per 300 grams of the resin, the resin comprising also components adapted for mutual reaction with the resol and selected from a group consisting of natural resin acids and unsaturated acids of fatty oils, by protracted heating in a slightly acid medium, at a temperature and for a period insufficient for carrying out the hardening reaction but sufficient for effecting etherification, removing the water, and interrupting the heating before gelation takes place.

6. In a process for producing hardenable resins, the improvement which comprises combining (1) a hydrocarbon compatible liquid resol free from alkaline catalyst, obtained from a phenol having more than two aliphatic C-atoms per each phenolic nucleus, with (2) a plasticizing alkyd resin containing long aliphatic chains and having an excess of free primary alcoholic OH groups over the carboxylic groups of the ester forming components, said excess amounting to at least one gram OH group per 300 grams of the resin, by protracted heating in a slightly acid medium, at a temperature and for a period insufficient for carrying out the hardening reaction but sufficient for effecting etherification, removing the water, and interrupting the heating before gelation takes place.

7. In a process for producing hardenable resins, the improvement which comprises combining (1) a hydrocarbon-compatible liquid resol free from alkaline catalyst, obtained from a phenol having more than two aliphatic C-atoms per each phenolic nucleus, with (2) a plasticizing alkyd resin containing long aliphatic chains and having an excess of free alcoholic OH groups over the carboxylic groups of the ester forming components, said excess amounting to at least one gram OH group per 300 grams of the resin, by protracted heating in the presence of an acid catalyst, at a temperature and for a period insufficient for carrying out the hardening reaction but sufficient for effecting etherification, removing the water, and interrupting the heating before gelation takes place.

8. A hardenable resinous composition produced according to claim 1.

HERBERT HÖNEL.
HEINRICH MANZANO.

(References on following page)

REFERENCES CITED

The following references are of record in the file of this patent:

UNITED STATES PATENTS

| Number | Name | Date |
|---|---|---|
| 1,988,354 | Honel | Jan. 15, 1935 |
| 2,046,318 | Brubaker | July 7, 1936 |
| 2,337,874 | D'Alelio | Dec. 28, 1943 |
| 2,338,543 | Rosenblum | Jan. 4, 1944 |

FOREIGN PATENTS

| Number | Country | Date |
|---|---|---|
| 889,799 | France | Jan. 19, 1944 |